UNITED STATES PATENT OFFICE 2,467,342

POLYVINYL ACETAL COMPOSITIONS CONTAINING COLLOIDAL SILICA

Raymond B. Seymour, Dayton, Ohio, assignor to Monsanto Chemical Company, St. Louis, Mo., a corporation of Delaware No Drawing. Application November 17, 1944, Serial No. 563,994

3 Claims. (Cl. 260—41)

The present invention relates to improved polyvinyl acetal resins and more particularly to polyvinyl acetal resins containing silica in colloidal form and to a process for producing the same. This invention also provides liquid polyvinyl acetal organosols containing colloidal silica.

The polyviny acetal resins with which the invention is concerned may be prepared by reacting polyvinyl alcohol or a partially hydrolyzed polyvinyl ester with an aldehyde in the presence of an acetal condensation catalyst such as a mineral acid, or by simultaneously de-esterifying and acetalizing a polyvinyl ester. The aldehyde employed in the acetalization may be formaldehyde, acetaldehyde, propionaldehyde, butyraldehyde or a mixture of one or more of these aldehydes. The present invention thus embraces colloidal silica-containing polyvinyl formals, polyvinyl acetals, polyvinyl propionals, polyvinyl butyrals or mixed polyvinyl acetals such as that obtained by reaction of polyvinyl alcohol or a partially hydrolyzed polyvinyl ester with a mixture of acetaldehyde and butyraldehyde. Polyvinyl acetal resins may be prepared by the process described in the Robertson Patent Nos. 2,162,-678–9, and 2,162 680 and the Morrison Patents Nos. 2,036,092, 2,168,827, 2,176,859 and 2,179,051.

The use of non-colloidal silica as a filler for vinyl resins is well known. For example, in the Stose Patent No. 2,116,986 diatomaceous earth, which is practically pure silica, is employed as a filler in the manufacture of phonograph records from vinyl resins. Crushed quartz has been suggested for the same purpose in the preparation of molded electrical insulating agents from polystyrene in the Berberich Patent No. 2,333 513. Silica gel has been suggested for use as filler with polymerized ethyl acrylate in the Nowak and Hofmeier Patent No. 2,209,928. In such previous applications the siliceous material was merely employed in mechanical admixture with the vinyl resin, the resin serving as a bonding material for the silica particles. That no permanent combination between the silica and the resin was formed may be shown, for example, by the fact that the siliceous filler and the vinyl compound could be separated from each other by adding the filled, molded resin to a material which was a solvent for the resin, whereupon the resin dissolved to give a solution of the resin in the presence of undissolved silica particles. There was no permanent combination or dispersion of the silica particles in the vinyl resin, because the silica and the resin could be separated from each other by leaching the silica filled resin with a solvent. It is possible thereby to separate the silica from the resin and to recover both components in unchanged form by removal of the solvent.

The combinations herein disclosed, on the other hand, are not separable by leaching with a solvent. As a matter of fact, as will be pointed out below, dispersions of colloidal silica in polyvinyl acetal resins can be obtained which are totally insoluble in the usual solvents for polyvinyl acetals. However, in those combinations of polyvinyl acetals and silica where the silica is present in quantity less than that which will produce insolubility, no separation of silica and polyvinyl acetal takes place when the resins are dissolved in suitable solvents. Indeed, the solvent may be evaporated and the silica-containing resin recovered in the same form in which it existed prior to solution.

Accordingly, previously known mechanical admixture of vinyl resins and non-colloidal siliceous materials could not be employed to obtain homogeneous, smooth, cast films; for in casting the mixtures from solutions the silica separated out to give heterogeneous, brittle films that were characterized by a rough surface and a lack of clarity. Molded pieces prepared from mechanical admixtures of a vinyl resin and silica likewise lacked homogeneity. Hence, in spite of the known favorable heat-resisting and electrical insulating properties of silica, the prior art did not know how to incorporate it into a resinous material without incurring thereby a loss of clarity, flexibility and smoothness in the resulting products.

In the prior art products, there was no true combination of the ingredients, each member of the aggregation retaining its own properties. In the case of the present products, the silica, while not losing its colloidal character, imparts valuable properties to the vinyl acetal resin itself, as will be pointed out in detail below.

I have found that when I combine a polyvinyl acetal resin with a collodial siliceous material which is in sol form, I am able to obtain a stable organosol which may be cast into flexible, transparent homogeneous films having good mechanical properties and very high resistance to heat and solvents. While polyvinyl acetal resins as such are too soft to be readily molded, the present colloidal silica-containing polyvinyl acetals may be submitted to hot molding operations to yield hard, transparent objects. I may use an aquasol or an alcohol sol of silica, for example, the aquasol disclosed in the Marshall Patent No.

2,285,449 or a silica sol in a monohydric lower aliphatic alcohol, i. e., an alcohol of from 1 to 5 carbon atoms, or the aqua organosols of the Marshall Patents Nos. 2,356,773 and 2,356,774. I may also employ silica sols made by the method disclosed in Patent No. 2,244,325 and in the Neudlinger Patent No. 1,835,420.

The silica sols employed herein are composed of colloidal particles of $SiO_2$ having a size ranging downwardly from about 600A units. By the process disclosed in the Marshall Patent No. 2,285,449, referred to above, the colloidal particles are generally needle-like in structure, the diameter thereof being in the neighborhood of 35 A units. Larger colloidal particles may be formed from the needle-like particles by a lengthening of the chain of molecules comprising the particle. The larger particles, in the 600A range, are probably composed of closely knit bundles of the fibrous or needlelike variety.

The silica sol may be incorporated into the polyvinyl acetal by dissolving the polymeric material, adding the sol to the resulting solution and then removing the sol medium and, if desired, the solvent, by distillation or by merely separating two liquid immiscible phases. When employing this procedure, for many purposes removal of the solvent and the sol medium is unnecessary. For example, solutions which may be cast into films or used as coatings are obtained by dissolving a polyvinyl acetal in a solvent, for example, ethanol, and adding an isopropanol or other alcohol silica sol to the solution.

When operating by the procedure described above, employing from, say, 2% to 70% by weight of colloidal silica (calculated as $SiO_2$) of the total weight of the vinyl acetal and silica, there are obtained homogeneous silica-containing materials which may be cast or molded to give colorless objects or films of very good mechanical properties and high heat-resistance.

Particularly valuable properties are obtained by combining plasticized polyvinyl acetal resins with the silica sols. When the polymeric polyvinyl acetals are plasticized with such plasticizers as dibutyl phthalate, tricresyl phosphate, etc., there are obtained films which though flexible, are undesirable for certain purposes because of their excessive tackiness. While this property is of value when the material is to be used as an adhesive, when the plasticized polymeric vinyl acetals are to be used in coatings or in the manufacture of cast films, the extreme tackiness is a distinct drawback. I have found, however, that when a silica sol, for example, a silica aquasol or a silica organosol, is added to a solution or an emulsion of a polyvinyl acetal resin containing one or more of the known plasticizers, films cast from the solution or emulsion are clear, nontacky, tough and elastic. Attempts to incorporate ordinary silica with the polyvinyl acetals by dispersing the silica in a ball mill with water and emulsifier and adding this to the emulsion of polymer have resulted in opaque, brittle resins. Evidently, the colloidal structure of the silica sol is the instrumental factor in the production of clear, flexible, siliceous polyvinyl acetals, for I have found that when silica sol is added to the emulsion of polymer, in the presence or absence of a plasticizing agent, the resulting films are substantially as clear as those prepared from the vinyl acetals in absence of silica.

There is a gradual gradation of properties in the siliceous polyvinyl acetal films, which depends upon the quantity of silica sol employed.

I have found the optimum quantity of the sol, calculated as $SiO_2$, to be from, say, 5% to 25% by weight of the combined vinyl acetal and silica. When the quantity of silica exceeds, say, 30%, the polyvinyl acetal films are slightly brittle, although plasticizers may be employed to minimize this drawback. When the quantity of silica is equal to that of the polyvinyl acetal, the resulting films are opaque, though continuous. On the other hand, films containing from, say, 6% to 25% of the silica sol are stronger, more elastic, and less tacky than plasticized or unplasticized polyvinyl acetal films formed in the absence of silica sol. The heat-resisting properties of the silica sol-containing films are thereby materially increased, as will be hereinafter disclosed.

While polymeric vinyl acetal films containing more than 30% of the colloidal silica are somewhat brittle, such films are of interest as coating materials for various purposes in the electrical arts, where they may be applied to supporting surfaces. With colloidal silica contents as high as 80% to 90% by weight, the balance being a polyvinyl acetal such as polyvinyl formal or polyvinyl butyral, the combination can be produced in the form of extremely thin, continuous films.

The present invention is further illustrated, but not limited, by the following examples:

*Example 1*

Various proportions of an isopropanol silica sol (containing 20% by weight of $SiO_2$) were added to a 21% ethanol solution of a polyvinyl acetal resin known to the trade as "Butvar." Films which were cast from the resulting solutions were continuous and had the following properties:

| Polymer | $SiO_2$ | Softening Point | Melting Point | Clarity |
|---|---|---|---|---|
| Grams | Grams | ° C. | ° C. | |
| 100 | 0 | 98 | 185 | Clear. |
| 100 | 10 | 123 | 225+ | Do. |
| 100 | 50 | 131 | 225+ | Cloudy. |
| 100 | 100 | 147 | 225+ | Opaque. |

The above determination of softening and melting points were made on the copper Maquenne bar.

Portions of the solutions were also precipitated by pouring into 50% ethanol. There was practically no silica in the filtrate, and the precipitated, dried products had softening points which correlated well with the original silica content of the solutions. This shows that the silica sol is combined with the polymer in such a manner that the union is not disrupted during solution and precipitation processes and indicates a highly stable structure which is something more than the usual physical combination.

"Butvar" is the name of a resinous material produced by condensing butyraldehyde with a partially hydrolyzed polyvinyl acetate. The commercial product may contain approximately 19% of hydroxy groups, 1% of acetate groups and 80% of butyraldehyde groups.

*Example 2*

25 g. of "Butvar" resin was dissolved in 150 g. of isopropanol and 6.25 g. of an isopropanol silica sol (containing 20% of $SiO_2$) was added to the solution. Films cast from the resulting homogenized mixture were continuous and practically clear.

A portion of the mixture was poured into a 10% aqueous solution of ethanol, the precipitated product was filtered, washed and dried. There was no evidence of silica in the filtrate and the dried product had a softening point which was higher than that of untreated "Butvar" resin.

*Example 3*

A 21% solution of "Butvar" in methanol containing 10% by weight of $SiO_2$, based on the weight of the "Butvar" was made up by adding a propanol silica sol (containing 20% of $SiO_2$) to the methanol solution of resin. The resulting solution was spun by extruding it at a temperature of 25° C. under a pressure of 80 lbs. into water held at the same temperature and containing 0.3% by weight of a wetting agent known to the trade as "Santomerse" (the sodium salt of an alkyl benzene sulfonic acid). The spinnerette employed had 25 orifices, each of which had a diameter of approximately 0.0035 inch, and the coagulating bath was a trough having a length of approximately 4 feet. The resulting fiber had a tenacity and a degree of heat-resistance which exceeded that of a "Butvar" fiber prepared similarly but in the absence of a silica sol.

*Example 4*

25 g. of a polyvinyl acetal resin known to the trade as "Formvar" was dissolved in 150 g. of isopropanol and 11.5 g. of isopropanol silica sol (containing 20% of $SiO_2$) were added to the resulting solution. Films cast from the solution were flexible and continuous and were characterized by softening and melting points that were considerably higher than those of films prepared from "Formvar" in the absence of the silica sol.

"Formvar" is the name of a resinous material produced by condensing formaldehyde with a partially hydrolyzed polyvinyl acetate. The commercial product may contain 14% acetate groups, 5% hydroxy groups and 81% formal groups.

The inclusion of silica sol in other polyvinyl acetals is also instrumental in increasing thermal resistance without adversely affecting the flexibility, and within certain ranges of silica sol, the clarity of the same. Valuable products are also obtained by incorporating plasticizers into the colloidal silica-containing polyvinyl acetal resins.

Because of the excellent thermal and physical properties of polyvinyl acetal resins containing silica sol they are valuable for the production of cast, extruded or molded parts for the following purposes:

Interlayers for safety glass, wire coatings, photographic films, surgical instruments (which may be sterilized without distortion), cast or molded electrical insulating materials, automobile windshields, etc. The present materials may be drawn or extruded into threads or fibers. As hereinbefore described, the present silica sol-containing polyvinyl acetals are particularly valuable in the production of coating materials and cast films. Because of their ability to control the stickiness which is often developed when polyvinyl acetals are incorporated with plasticizers, the silica sols are very advantageously employed with this combination. As plasticizers may be used any non-volatile material which is known to be compatible with polyvinyl acetal resins and to have a plasticizing effect when incorporated therein.

A variety of methods may be utilized in applying the principle of my invention and the products produced thereby, the invention being limited only by the appended claims.

What I claim is:

1. The process of forming an organosol which comprises mixing together an isopropanol silica sol with a solution of a polyvinyl resin selected from the group consisting of polyvinyl formal, polyvinyl acetal and polyvinyl butyral, drying the resulting mixture and recovering a product containing from 2% to 70% by weight of silica, the balance of said product being said polyvinyl resin, the amount of isopropanol silica sol employed in forming said mixture being sufficient to supply to the said product the said 2% to 70% by weight of silica, the silica in said product being inseparable upon solution of said product in a solvent for said resin.

2. The process of forming an organosol which comprises mixing together an isopropanol silica sol with a solution of a polyvinyl butyral resin, drying the resulting mixture and recovering a product containing from 2% to 70% by weight of silica, the balance of said product being said polyvinyl butyral resin, the amount of isopropanol silica sol employed in forming said mixture being sufficient to supply to the said product the said 2% to 70% by weight of silica, the silica in said product being inseparable upon solution of said product in a solvent for said resin.

3. The process of forming an organosol which comprises mixing together an isopropanol silica sol with a solution of a polyvinyl butyral resin, drying the resulting mixture and recovering a product containing from 5% to 25% by weight of silica, the balance of said product being said polyvinyl butyral resin, the amount of isopropanol silica sol employed in forming said mixture being sufficient to supply to the said product the said 5% to 25% by weight to silica, the silica in said product being inseparable upon solution of said product in a solvent for said resin.

RAYMOND B. SEYMOUR.

REFERENCES CITED

The following references are of record in the file of this patent:

UNITED STATES PATENTS

| Number | Name | Date |
|---|---|---|
| 2,285,477 | White | June 9, 1942 |
| 2,317,891 | Dennison | Apr. 27, 1943 |
| 2,375,388 | Ryan | May 8, 1945 |
| 2,408,656 | Kirk | Oct. 1, 1946 |